Dec. 16, 1969 D. B. ARMSTRONG 3,484,700
ASYNCHRONOUS SEQUENTIAL SWITCHING CIRCUIT USING NO DELAY ELEMENTS
Filed March 31, 1967
FIG. 1
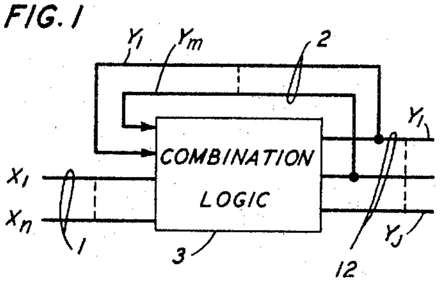
FIG. 2
| X | 0 | 1 | | |
|---|---|---|---|---|
| | STATE | STATE | $Y_1$ | $Y_2$ |
| | $1_s$ | 2 | 0 | 0 |
| | 3 | $2_s$ | 0 | 1 |
| | $3_s$ | 4 | 1 | 1 |
| | 1 | $4_s$ | 1 | 0 |
FIG. 3
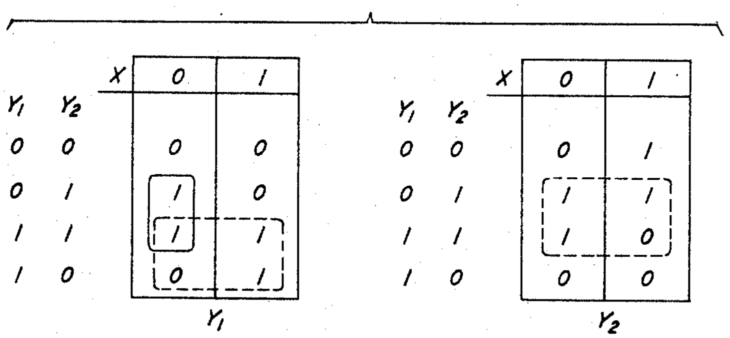
FIG. 4
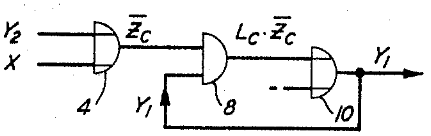
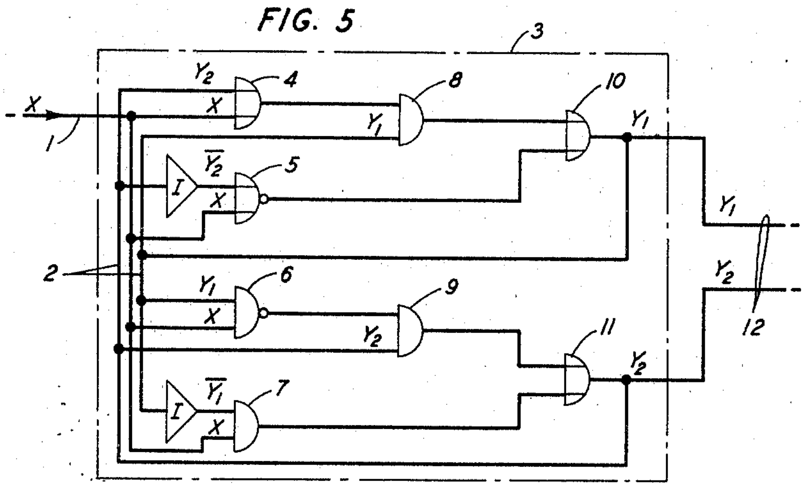
FIG. 5
INVENTOR
D. B. ARMSTRONG
BY R.O. Nimz
ATTORNEY

United States Patent Office 3,484,700

Patented Dec. 16, 1969

3,484,700

ASYNCHRONOUS SEQUENTIAL SWITCHING CIRCUIT USING NO DELAY ELEMENTS

Douglas B. Armstrong, Bedminster, N.J., assignor to Bell Telephone Laboratories, Incorporated, Murray Hill and Berkeley Heights, N.J., a corporation of New York

Filed Mar. 31, 1967, Ser. No. 627,413

Int. Cl. H02k *19/14*

U.S. Cl. 328—92 9 Claims

ABSTRACT OF THE DISCLOSURE

An asynchronous sequential circuit for realizing a sequential function without the use of delay elements. Changes in circuit input signals are introduced directly into the combination logic where they are combined with undelayed combination logic output signals fed back over direct connection feedback paths to alter the combination logic output signals. The altered output signals immediately replace the preceding output signals on the feedback lines and are combined with the new input signals to maintain the combination logic output as it is until another change in input signals occurs.

BACKGROUND OF THE INVENTION

Field of the invention

This invention relates to switching circuits and more particularly to asynchronous sequential switching circuits using no delay elements.

Description of the prior art

A sequential circuit is a switching circuit in which the present output of the circuit is dependent upon both the present and past inputs to the circuit. In other words, the circuit has a memory which retains information about the past inputs to the circuit. The information retained in this memory is combined with the present inputs to the circuit to produce the present circuit output.

An asynchronous sequential circuit is a sequential circuit that requires no clock pulses for its operation. This type of sequential circuit is desirable because it takes advantage of the inherent operating speed of the circuit and eliminates the need for clock pulses. However, the elimination of clock pulses introduces the problem of insuring that the circuit operates according to its design, independently of the various transmission delays inherent in the circuit.

The classical asynchronous sequential circuit consists of present inputs, combination logic for combining the present inputs with feedback signals representing past inputs, and feedback paths from the output side of the combination logic to its input side, to obtain signals representing past inputs. The combination logic outputs are transformed into signals representing past inputs by including a delay element in each feedback path. In other words, if such a circuit has $n$ inputs and requires $m$ feedback paths it will also require $m$ delay elements.

The delay element in each feedback loop delays the transmission of any change in signal on the feedback lines for an interval equal to its delay. Consequently, the signals at the terminal end of a feedback loop, representing past input signals, remain unchanged after a change in present input signals for an interval equal to the delay in the loop. Thus, the newly changed inputs, representing present inputs, may be combined with the signals on the terminal end of the feedback loops, representing past inputs, to determine the present output of the circuit. Such a circuit is shown in Haring, sequential circuit Synthesis, p. 6 (1961).

While the above circuit configuration may be used to realize sequential functions, the use of a delay element in each feedback loop makes it expensive where numerous feedback loops are required. This has resulted in attempts to reduce the number of delay elements required in asynchronous sequential circuits.

A single delay asynchronous sequential circuit has been developed by S. H. Unger and is disclosed in the article, "Hazards and Delays in Asynchronous Sequential Circuits," IRE Transactions on Circuit Theory, vol. CT-6, pp. 12–25 (March 1959). All of the combination logic feedback loops in this circuit are used as inputs to a common delay element. The output of the delay element is then introduced into the input side of the combination logic to be combined with present input signals. This circuit configuration can be used to realize any sequential function without introducing steady state hazards (i.e., a change in input causing the circuit to go to the incorrect terminal internal state). However, the use of a common delay element for all the circuit feedback paths requires that only one of the combination logic feedback signals be allowed to change at any given time.

The copending application of Friedman and Menon, Ser. No. 627,450 filed Mar. 31, 1967 also shows an asynchronous sequential circuit which requires the use of only one delay element. This circuit has input logic which delays the transmission of a change in circuit input signals for an interval equal to the delay provided by a delay element. During this delay interval, inhibit signals are transmitted to the circuit output logic. They maintain the circuit output logic in its existing state. Additionally, the inhibit signals are such that they have no effect on the existing state of the combination logic. Consequently, during the delay interval, both the circuit interval state and output remain stable. Upon the expiration of the delay interval, the inhibit signals are replaced by signals representing the change in input. When these delayed input signals arrive at the combination logic they are selectively combined with undelayed feedback signals representing the current combination logic output to determine the next internal state of the circuit. As a result of this combination, the output signals of the combination logic are altered in a prescribed manner. The altered combination logic output signals are then selectively combined with the delayed input signals by the circuit output logic to maintain the circuit output as it is until there is another change in circuit input. This circuit can be used to realize any normal mode sequential function without introducing either steady state or transient hazards.

Asynchronous sequential circuits have found numerous applications in the data processing fields. P. H. Bardell Jr. Patent 3,241,122, issued Mar. 15, 1966, shows asynchronous sequential data processing circuits for processing ternary coded information. Similarly F. J. Sparacio Patent 3,166,737, issued Jan. 19, 1965, discloses an asynchronous data processor.

SUMMARY OF THE INVENTION

It is an object of the present invention to reduce the cost of circuits used to realize sequential functions which provide hazard-free operation.

It is a more specific object of the invention eliminate the need for delay elements in a circuit used to realize normal mode sequential functions which provides operation free of steady state hazards.

In accordance with the present invention, a single rail values of a change in input signals is applied directly to the input gates of the circuit combination logic. The circuit characteristics are such that the maximum inherent delay involved in transmitting a change in input over any of the input lines is less than the minimum delay in transmitting the result of the change through the combination logic and back to the input on a feedback loop. Consequently, all of the changes in input signals are present at the combination logic input gates before any change in feedback signals is felt at any of the input gates. The input signals are selectively combined with the undelayed feedback signals which consist of the pre-existing combination logic output. Since the pre-existing combination logic output is a function of the past input signals, this represents a combination of present input signals and the past input signals. As a result of this combination of input signals and pre-existing combination logic output signals, selected gates in the combination logic are enabled, which in turn alter the output of the combination logic. This change in the combination logic output is coupled back over the feedback paths and results in the altered combination logic output being maintained by enabling or disabling selected input gates. Circuit operation is such that a number of the feedback signals may change simultaneously during a transition without introducing steady state hazards. At this point, the combination logic output will remain unchanged until another change in input occurs.

One advantage of this circuit is the savings in cost and increased reliability resulting from eliminating the need for delay elements in circuits realizing a normal mode sequential function which provide operation free of steady state hazards.

Another advantage is the increased speed of circuit operation achieved by allowing a number of the combination logic feedback signals to change simultaneously.

These and other objects and features, the nature of the present invention and its various advantages, will be more fully understood upon consideration of the attached drawings and of the following detailed description of the drawing.

The drawings are:

FIG. 1 shows a general block diagram of the present invention having *n* input signals, *m* feedback signals and *j* output signals;

FIG. 2 is a flow table of the sequential function realized by the circuit shown in FIG. 5;

FIG. 3 shows the maps of internal state functions in the circuit shown in FIG. 5;

FIG. 4 is a schematic diagram used as an aid in describing how applicant's invention avoids races on its second level logic; and FIG. 5 is a schematic diagram of the circuit used to realize the sequential function shown in the flow table of FIG. 2.

GENERAL DESCRIPTION

The circuit in FIG. 1 has the following characteristics; the maximum delay inherent in transmitting a change in an input signal over any one of the input lines 1 is less than the minimum delay involved in the combination logic 3 responding to a change in input, by altering its output signals, and transmitting this change over one of the feedback paths 2 to its input. This condition is easily satisfied when the circuit in FIG. 1 is constructed using integrated circuit components. Distances between these components are very small and the inherent delay in interconnections between components are small. In other words, the length of the input lines 1 would be very short and the delay in transmitting a signal change over any one of the lines would be small. When the length of the input lines become less than some length *r*, their inherent transmission delay will be less than the response time of the gates comprising the combination logic. Consequently, as a result of the use of integrated circuit components, circuits having the above characteristic will be common.

Returning to FIG. 1, circuit input signals are transmitted over a plurality of input lines 1 and introduced directly into the circuit combination logic 3. Additionally, undelayed combination logic output signals are fed back over feedback lines 2 and introduced into the combination logic 3. The input signals on the input lines 1 and the combination logic output signals on the feedback lines 2 are selectively combined by the combination logic 3 in a manner determined by the sequential function being realized. The existence of selected combinations of the input signals and the feedback signals result in predetermined combination logic output signals.

When a change in input signals occurs, the change is transmitted over the input lines 1 to the combination logic 3. As was noted above, the change in input will arrive at all of the combination logic gates affected by the change before any of the gates in the combination logic can respond and alter the feedback signals felt at its input. The changed input signals are combined with the pre-existing feedback signals present on the feedback lines 2 and result in the combination logic output signals being altered. The altered output signals are fed back over the feedback lines 2 and combined with the new input signals to maintain the combination logic output signals as they are until another change in input signals occurs.

Discussion of the sequential function and steady state hazard elimination

As was mentioned, applicant's invention provides operation free of steady state hazards for all normal mode sequential functions. A normal mode sequential function is defined as a sequential function that can be represented by a flow table in which the transition from any unstable state is directly to a stable state. In other words, such a function passes through only one unstable state during a transition from an initial stable state to a terminal stable state. FIG. 2 shows a flow table representing such a function. The only reason for using an example with a single input X is to simplify the explanation of applicant's invention. Sequential functions having *n* inputs may be realized using applicant's invention in the form of the *n* input circuit shown in FIG. 1.

Referring to FIG. 2, the "0" and "1" columns of the flow table represent the two values the input X may have. The numbers appearing under the subcolumn headings "state" represent the various states of the function. A number in either of these column subscripted with an "*s*" represents a stable state. Those numbers having no "*s*" subscript represent unstable states.

The numbers in the $Y_1Y_2$ column represent the binary output of a circuit used to realize the function shown in the flow table when the circuit's internal state is represented by a state designation located in the same row in one of the state columns. Additionally, the numbers in the $Y_1Y_2$ column also represent the values of the feedback signals on the feedback lines 2 (FIG. 1) for various circuit internal states.

When a circuit which realizes the sequential function represented by the flow table in FIG. 2 is in a stable state and its input is the value shown directly above the stable state, no transition in the circuits internal state will occur. For instance, if a circuit realizing the sequential function in FIG. 2 is in the $1_s$ stable state and its input X is "0," the circuit's internal state will remain $1_s$. On the other hand, if the circuit is in the $1_s$ stable state and the X input changes to a "1," there will be a transition in the circuit's internal state. The circuit's internal state will change from the stable $1_s$ state to the unstable 2 state and finally to the stable $2_s$ state if there are no steady state hazards involved in the circuit's operation.

An example of the circuit operation required by the sequential function shown in FIG. 2 is as follows: Assuming the circuit is in the stable $1_s$ state, where $Y_1=Y_2=0$, and the X input changes from "0" to "1," the circuit's internal state will change from the $1_s$ state to the unstable state 2. In unstable state 2, the $Y_2$ signal is unstable and will ultimately change from "0" to "1." When this change occurs, the circuit's internal state will become stable state $2_s$.

As long as the circuit input X remains "1," the circuit's internal state will remain stable state $2_s$. However, if X (FIG. 2) changes from "1" to "0" during the time the circuit's internal state is $2_s$, there will be a transition from the $2_s$ state to the unstable state 3. In the unstable state 3, the signal $Y_1$ is unstable and it will ultimately change to a "1." When this occurs, the internal state of the circuit will become the stable $3_s$ state and it will remain so as long as X remains a "0." During this state the circuit output will be $Y_1=1$ and $Y_2=1$ (FIG. 2).

If X becomes a "1" during the $3_s$ state, there will be a transition from $3_s$ to stable state $4_s$ by way of unstable state 4. During unstable state 4, $Y_2$ is unstable and will ultimately change from "1" to "0," giving a circuit output of $Y_1=1$ and $Y_2=0$.

Similarly, a change in X, from "1" to "0," during the $4_s$ will result in a transition from $4_s$ to unstable state 1, and finally to stable state $1_s$. Here, the $Y_1$ signal becomes unstable during unstable state 1 and changes from "1" to "0" giving a circuit output of $Y_1=0$ and $Y_2=0$. It will be noted that this is the state the circuit was assumed to be in at the outset of the discussion. In other words, the circuit acts as a modulo 4 counter. It starts out in a given state and after its input has changed four times it is back in its starting state.

Problems arise in realizing a sequential function such as the one shown in FIG. 2 if the circuit used to realize it creates a potential race condition between a change in the X input and a change in the Y state variables. A race condition is defined as a condition where the terminal state in an internal circuit state transition depends on the order in which the circuit sees changes in variables such as the input signals X (FIG. 2) and the feedback signals Y. Such a race condition may result from, among other things, differences in transmission delays inherent in the connections introducing the X input signals (FIG. 1) into the combination logic 3 (FIG. 1). This condition is undesirable since, as a result of the race being resolved in a manner not anticipated, the circuit may not operate according to its design requirements.

The effects of a race condition may be illustrated by referring to FIG. 2 and assuming that the circuit is in the $1_s$ state when X changes from "0" to "1." If the circuit is such that the change in X reaches a gate which results in $Y_2$ becoming a "1," but is delayed in reaching certain other gates in the combination logic 3 (FIG. 1), there will be a state transition from stable state $1_s$ to unstable state 3. This differs from the desired transition which, as indicated above, would be the transition from $1_s$ to 2 if there were no X–$X_2$ race present and all of the combination logic gates having X as an input saw the change in X before there was a change in $Y_2$.

When the circuit erroneously enters the unstable 3 state, $Y_1$ becomes unstable and will change from "0" to "1" resulting in the circuit internal state becoming the stable $3_s$ state. At this point, the circuit output will be $Y_1=1$, $Y_2=1$ instead of $Y_1=0$, $Y_2=1$ as it should be. The circuit will remain in the $3_s$ state until the delayed "0" to "1" change in X reaches the other gates it drives in the combination logic 3 (FIG. 1). When this occurs, there will be a transition from $3_s$ to unstable state 4 and finally to stable state $4_s$ when $Y_2$ changes from "1" to "0." The circuit will remain in the stable $4_s$ state as long as X remains a "1." The circuit output is now $Y_1=1$, $Y_2=0$ which correctly indicates the existence of the erroneous internal state $4_s$. However, the correct terminal internal state for the transition from the state $1_s$, when X changes from "0" to "1," is $2_s$ which results in a circuit output of $Y_1=0$, $Y_2=1$.

The problem is that, for a single change in X, the internal state of the circuit has changed from $1_s$ to $4_s$. This would erroneously indicate to external circuitry being driven by the circuit, that there has been three changes in X. That is, if there were no race involved, it would require a "0" to "1" change in X to go from $1_s$ to $2_s$, a "1" to "0" change in X to go from $2_s$ to $3_s$ and an "0" to "1" change in X to go from $3_s$ to $4_s$. Consequently, the possibility of such an unpredictable circuit response cannot be tolerated if the output of the circuit is to be used meaningfully.

Another source of potential race conditions is the use of double rail values of an input such as X to drive the first level gates of the combination logic. That is, a race condition can result from using both the signal value of X and its complement $\overline{X}$, where $\overline{X}$ is obtained by inverting the signal value of X, to drive the combination logic gates initially responsive to a change in input. Gates 4 through 7 (FIG. 5) are examples of first level gates in the combination logic. The use of an inverter introduces an unknown delay in the transmission of the signal $\overline{X}$ and it is possible that a change in X will reach the combination logic before its complement $\overline{X}$ does. If the early arrival of X can result in an alteration of the feedback signals felt at the first level gates before $\overline{X}$ arrives, then a steady state hazard may exist. In other words, if the terminal state of the transition resulting from the change in X is dependent upon the combination of $\overline{X}$ with a feedback signal existing at the time X changed, and that feedback signal is altered before the change in $\overline{X}$ can reach the first level gate, there is a steady state hazard. The signal $\overline{X}$ can no longer be combined with the pre-existing feedback signal to bring about the correct state transition since the pre-existing feedback signal has been prematurely altered.

Applicant eliminates the $X-\overline{X}$ race condition by using only single rail or uncomplemented values of X as input to the combination logic. Most sequential circuits use double rail values of the input signals because it is generally necessary to use both the complemented and uncomplemented values of the input signals to realize a sequential function. However, single rail input values can be used if the first level gates realizing logic terms containing complemented input values are complement logic. For example, if the only input to a circuit's combination logic is the single rail value X and the sequential function being realized requires logic responsive to $\overline{X}\cdot Y$, it is possible to realize $\overline{X}\cdot Y$ using a NOR gate. Applying De Morgan's theorem, $(\overline{\overline{X}\cdot Y})=X+\overline{Y}$. Obviously, using the single rail value of X and $\overline{Y}$ as inputs to a NOR gate results in the same function as using $\overline{X}$ and Y as inputs to an AND gate.

Consequently, it is possible to realize any sequential function in terms of combination logic whose first level gates require only single rail values of the input signals. It is apparent that there can be no $X-\overline{X}$ race on the first level gates of such combination logic singe $\overline{X}$ is not used to drive these gates.

Furthermore, no $X-Y$ race condition will exist for the first level gates of applicant's circuit due to the circuits operating characteristics. As was mentioned above, the circuit is such that any change in the input signal X will arrive at the first level gates 4–7 (FIG. 5) before any feedback signals Y (FIG. 5) at these gates can be changed.

To this point, it has been shown that races on the first level gates of the combination logic which result in steady state hazards can be eliminated without the use of delay elements. The $X-\overline{X}$ race condition is eliminated by using only single rail values of the input signals to drive these gates. The $X-Y$ race condition is eliminated by insuring that the maximum delay in transmitting a change in input is less than the time required for the combination logic to respond to the change and alter any of the feedback signals felt at the first level gates. As has been mentioned, this is accomplished by using a circuit whose input lines are very short.

In addition to eliminating races on the first level gates, it is also necessary to eliminate races on the second level gates. The second level gates are those gates in the combination logic which respond to signals resulting from the outputs of the first level gates. Gates 10 and 11 in FIG. 5 are examples of second level gates. Races on second level gates can occur when the output of a second level gate is a function of the output of either of two or more first level gates. An example would be the case where a second level OR gate should remain continuously enabled during a transition, but fails to remain so because the first level gate output initially enabling it goes to "0" before another first level gate output, which also enables it, goes to "1." This results in an undesired "1" to "0" change in the second level gate output which can result in a steady state hazard. More particularly, if the "1" output of a second level gate, representing a stable feedback signal for the particular transition being considered, goes to "0" during the transition, it can result in another feedback signal changing to an undesired value. If this occurs, the combination of the circuit input signals with the erroneously altered feedback signal can result in an erroneous terminal stable state.

The situation giving rise to the above race condition exists when the logic necessary to maintain the output of a second level gate at a steady "1" during a state transition requires more than one gate to drive the second level gate during the transition. In other words, when more than one first level gate is required to implement the logic that maintains the steady "1" output of the second level gate during a transition, there is a potential race condition.

The method used by applicant to avoid this problem is more easily understood by referring to FIG. 3 which shows a map of the $Y_1$ feedback signal associated with the sequential function in FIG. 2. The portion of the $Y_1$ map in FIG. 3 that is enclosed by the dotted line is referred to as the $3_s$ to $4_s$ transition subcube for $Y_1$. Generally, a transition subcube may be defined as that portion of a Y map which shows the pattern of values of the Y signal for a given state transition.

During the $3_s$ to $4_s$ (FIG. 2) state transition, $Y_1$ is stable and should remain a steady "1" if steady state hazards are to be avoided. Returning to FIG. 3, if all of the numerical entries in the $3_s$ to $4_s$ transition subcube were "1," it would be a simple matter to insure that $Y_1$ remains "1" during the transition. This could be accomplished by using only the signal $Y_1=1$ to enable the second level OR gate that generates $Y_1$. However, all of the entries in the transition subcube are not "1's" and therefore, it is necessary to determine a logic term or terms which will cover the "1's" in the subcube. A logic term is said to cover a certain portion of a map when it consists of variables describing the map whose values remain constant over that portion of the map.

The most obvious manner of cover the "1's" in the transition subcube would be to use the two logic terms $Y_1 \cdot Y_2$ and $Y_1 \cdot X$ (FIG. 3). Here $Y_1=1$, $Y_2=1$ for both "1" entries in the third row of the $Y_1$ map (FIG. 3) and $Y_1=1$, $X=1$ for the "1" entries in the third and fourth rows of the right-hand column of the $Y_1$ map. While these two terms taken together cover the "1's" in the subcube, two gates are required to implement them and the output of each of these gates must be used as inputs to the second level gate to maintain its output as a steady "1." This gives rise to the race condition mentioned above, where a second level OR gate generating the stable Y signal during a state transition is driven by the output of more than one gate. Assuming that the second level OR gate is to continuously generate a "1" output representing $Y_1$ during a transition, it is easily shown that if the "1" goes to "0" a steady state hazard can result. In this case, $Y_1$ could take the undesired value of "0" at the time the unstable $Y_2$ went to "0," disabling the gate driven by $Y_1 \cdot Y_2$, if the gate driven by $Y_1 \cdot X$ was not yet enabled at that time. If this occurred, both the inputs to the second level OR gate would be "0" and $Y_1$ would go to "0." This could result from the first level gate being driven by $Y_1 \cdot X$ having a slow response time. As a result of the erroneously produced $Y_1=Y_2=0$ and $X=1$ condition, the circuit would react as though a $1_s$ to $2_s$ (FIG. 2) transition were occurring and change $Y_2$ back to a "1." The gate driven by $Y_1 \cdot X$ would not come on since $Y_1=0$ and the terminal state of the transition would be the erroneous state $2_s$ instead of the correct state $4_s$.

Applicant avoids the above problem by using a special method to pick the logic term covering the "1's" in a transition subcube containing "0" entries. This logic term used by applicant may be denoted generally as $L_c \cdot \overline{Z}_c$; where $L_c$ is a logic term covering the entire transition subcube, including "0" entries, and $Z_c$ is the logical sum of the terms covering all of the "0" entries in the transition subcube. In other words, $L_c=1$ only over the entire transition subcube and each $Z_c=1$ only for that portion of the subcube which contains the "0" entries they cover. Referring to the $Y_1$ map in FIG. 3, the entire $3_s$ to $4_s$ transition subcube can be covered by $L_c=Y_1$ and the zero entries in the subcube can be covered by $Z_c=\overline{X} \cdot \overline{Y}_2$. That is, $Y_1$ is a "1" for the entire portion of the map enclosed in the dotted line in the $Y_1$ map and $X=0$, $Y=0$ for that portion of the map designated by the "0" entry enclosed in the dotted line. Hence, the resulting logic equation for $Y_1$ for this transition subcube is $$Y_1=Y_1 \cdot (\overline{\overline{X} \cdot \overline{Y}_2})=Y_1 \cdot (X+Y_2)$$

It should be noted that although the example in FIG. 3 shows transition subcubes with only one "0" entry, it is possible for a subcube to have more than one such entry. If this is the case, more than one $Z_c$ term may be required to cover all the "0" entries.

To implement the above logic equation one OR gate and one AND gate are required. Upon considering what occurs during the $3_s$ to $4_s$ (FIG. 2) state transition, it becomes clear that the use of the term $Y_1 \cdot (X+Y_2)$ to generate $Y_1$ will maintain it at a steady "1" during the transition. FIG. 4 shows the logic used to implement the above logic term which will maintain $Y_1$ as a steady "1" during the $3_s$ to $4_s$ state transition. As has been previously mentioned, none of the circuit feedback signals will be altered before a change in input has had time to reach all of the circuit's first level gates it will effect. Consequently, when, during the $3_s$ state (FIG. 2), X changes from "0" to "1," this change will arrive at gate 4 (FIG. 4) before either $Y_1$ or $Y_2$ is altered. During the $3_s$ state (FIG. 2), $Y_2$ is a "1" and OR gate 4 (FIG. 4) will be on when X changes from "0" to "1." Since the "0" to "1" change in X will arrive at gate 4 (FIG. 4) before $Y_2$ is altered, the subsequent change of $Y_2$ to "0" does not interrupt the steady "1" output of OR gate 4 (FIG. 4). The steady "1" output of gate 4 (FIG. 4) is combined with $Y_1$, which was a "1" during the $3_s$ state, to keep AND gate 8 (FIG. 4) continuously enabled. The continuous "1" output of AND gate 2 is applied as an input to OR gate 10, which generates $Y_1$, and results in $Y_1$ remaining a steady "1" during the $3_s$ to $4_s$ transition.

The above may be summed up as follows: when the transition subcube of a Y signal which is to remain a continuous "1" during a transition contains a "0" entry, the Y signal may be maintained as a steady "1" by using the Y signal and the complement of the logical term covering the zero entry as inputs to an AND gate. The output of this AND gate is then used to enable the OR gate which produces the Y signal. By definition, the Y signal is a "1" when the transition is initiated and, therefore, its continued generation becomes a function of the logical term covering the "0" entry in the subcube. Since the condition represented by the zero entry in the subcube can never be true during the transition, the complement of the logic term covering the "0" entry is a continuous "1." Consequently, the AND gate driven by the Y signal and the complemented "0" entry logic term is continuously enabled during the transition and the Y signal is maintained as a steady "1." If a transition subcube has more than one "0" entry, the logical sum of the logic terms covering all the "0" entries is used.

FIG. 3 shows that there is a "1" entry in the $Y_1$ map not enclosed in the dotted line representing the $3_s$ to $4_s$ transition subcube of $Y_1$. This "1" entry contained in the solid line on the $Y_1$ map (FIG. 3) is a part of the $2_s$ to $3_s$ transition subcube and it can be covered by a single logic term. The term $\overline{X}\cdot Y_2$ covers this "1" entry and results in $Y_1$ becoming a "1" during the unstable state 3 (FIG. 2) when a change in input results in the $2_s$ to $3_s$ state transition. For purposes of generality, this type of term may be denoted as a $T_i$ term.

From the above discussion it is possible to write the following general logic expression for any Y signal:

$$Y_j=\sum_{c}^{n} L_{j,c}\cdot\overline{Z}_{j,c}+\sum_{i}^{m} T_{j,i}$$

The above general equation may be explained as follows: The $\Sigma L_{j,c}\cdot\overline{Z}_{j,c}$ expression represents the logic terms resulting from applicant's special method of picking the variables to insure that $Y_j$ remains a constant "1" during each state transition for which $Y_j$ is required to remain a stable "1." It will be remembered that this expression eliminates races on the circuit's second level gates. The $\Sigma T_{j,i}$ expression represents the terms that change $Y_j$ from "0" to "1" during transitions in which $Y_j$ is unstable to result in the circuit going to a terminal stable state. For purposes of analysis, $L_{j,c}\cdot\overline{Z}_{j,c}$ terms may be thought of as "holding" terms and the $T_{j,c}$ terms may be thought of as "change" terms.

Applying applicant's special method yields a set of $L_{j,c}\cdot\overline{Z}_{j,c}$ terms each of which satisfies the following requirements: (1) it remains continuously true during the transition it is used to maintain a stable $Y_j$ signal at a constant "1"; (2) it becomes false during any transition where it is the term maintaining $Y_j=1$ and $Y_j$ is required to go to "0" during the transition; and (3) it remains false during any transition in which $Y_j$ is initially "0" and is to remain a stable "0."

The variables composing the $L_{j,c}$ and $\overline{Z}_{j,c}$ terms are picked by first partitioning the circuit variables into two subsets; one subset containing variables whose values are to remain a constant "1" during the transition being considered and another subset containing variables whose values are unstable during the transition. The $L_{j,c}$ term is then constructed by picking a selected combination of variables, including the $Y_j$ to be maintained as a stable "1," from the former subset. Since this term will be continuously true during the transition, it is considered a transitional-true term and the constant "1" values of the signals comprising it are considered transition-true signals.

The $Z_{j,c}$ term is constructed by picking a selected combination of the variables in the latter subset such that the variables in the selected combination can never all be "1" simultaneously during the state transition. This constant false condition of the $Z_{j,c}$ term during the transition results in $\overline{Z}_{j,c}$ (the inverse of $Z_{j,c}$) being a constant "1" during the transition. Consequently, $\overline{Z}_{j,c}$ is considered a transitional-false term and the constant "1" output of the gate implementing $\overline{Z}_{j,c}$ during the transition is considered a transitional-false signal.

During the given state transition, the transitional-true signals comprising $L_{j,c}$ are combined with the transitional-false signal of the gate implementing $\overline{Z}_{j,c}$ by an AND gate. Since both the transitional-true signals and the transitional-false signals will be constant "1's" during the state transition, the output of the AND gate combining them will be a constant "1" during the transition. The "1" output of this AND gate is used as an input to an OR gate which generates $Y_j$ and results in $Y_j$ remaining a constant "1" during the transition.

The variables comprising each $Z_{j,c}$ term are picked such that, in addition to never being all simultaneously "1" during the transition in which the term is to maintain $Y_j$ a constant "1," they will all become "1" simultaneously during the unstable state of a transition in which $Z_{j,c}$ initially results in $Y_j$ being "1," $L_{j,c}$ remains a constant "1" until $Y_j$ becomes "0," and $Y_j$ must change to "0." When the variables comprising $Z_{j,c}$ all become "1" simultaneously during this transition, $Z_{j,c}$ will become true and $\overline{Z}_{j,c}$ will become false. Hence, the transitional-false signal input to the AND gate combining the transitional-false signal and transitional-true signals will become "0" and the output of the AND gate will go to "0." As a result of this, there will be no "1" inputs to the OR gate generating $Y_j$ and $Y_j$ will go to "0" as required. When $Y_j$ goes to "0" during this transition, both the transitional-false signal input and the $Y_j$ input to the AND gate, whose output results in the generation of $Y_j$, will be "0." It should be noted that during transitions in which $Y_j$ becomes unstable and goes to "0," $\overline{Z}_{j,c}$ can remain a "1" if $L_{j,c}$ goes to "0" during the transition.

The $Y_j$ signal will remain "0" keeping the above AND gate disabled until it is changed back to a "1" by one of the "change" terms $T_{j,i}$ becoming true during another transition. The output of each of the gates implementing each of the "change" terms $T_{j,i}$ are also used as inputs to the OR gate generating $Y_j$. Consequently, when any one of the $T_{j,i}$ terms becomes a "1" during a state transition, the OR gate will be enabled and $Y_j$ will become a "1."

There will be as many $L_{j,c}\cdot\overline{Z}_{j,c}$ terms for a given $Y_j$ as there are state transitions during which $Y_j$ must be maintained as a stable "1." In the example in FIG. 2 there is only one $L_{j,c}\cdot\overline{Z}_{j,c}$ term for each of the signals $Y_1$ and $Y_2$ since each of these signals must be maintained a stable "1" for only one transition. The signal $Y_1$ must be maintained as a stable "1" during the $3_s$ to $4_s$ transition (FIG. 2) and $Y_2$ must be maintained as a stable "1" during the $2_s$ to $3_s$ transition (FIG. 2). As was noted above, the $L_{j,c}\cdot\overline{Z}_{j,c}$ terms for accomplishing this for $Y_1$ and $Y_2$ are the terms $Y_1\cdot(X+Y_2)$ and $Y_2\cdot(\overline{X\cdot Y_1})$ respectively. Similarly, there will be a $T_{j,i}$ term for each instance $Y_j$ must change from "0" to "1." Referring to FIG. 2, this example requires only one such term for each of the signals $Y_1$ and $Y_2$. The $Y_1$ signal changes from "0" to "1" only during the $2_s$ to $3_s$ transition and the $Y_2$ signal changes to "1" only during the $1_s$ to $2_s$ transition. The $T_{j,i}$ terms for accomplishing this for $Y_1$ and $Y_2$ are $\overline{X}\cdot Y_2$ and $X\cdot\overline{Y}_1$, respectively. Consequently, the OR gates producing $Y_1$ and $Y_2$ for the example in FIG. 2 will each have two inputs; one being a signal representing a $L_{j,c}\cdot\overline{Z}_{j,c}$ term and one being a signal representing a $T_{j,i}$ term. In circuits realizing more complicated sequential functions the inputs to each OR gate which generates a Y signal may consist of a number of signals representing a number of different $L_{j,c}\cdot\overline{Z}_{j,c}$ terms and a number of $T_{j,i}$ terms.

The above may be summarized as follows: The applicant eliminates races on the second level gates in a circuit by using a special method of picking the variables which maintain Y signals at a constant value during a state transition requiring them to remtain stable. This is accomplished by dividing the variables into two subsets; one subset consisting of the variables whose values remain a stable "1" for the particular state transition under consideration and another subset consisting of variables which are unstable during the transition. Then a transitional-true term is constructed from a selected combination of the variables in the former subset and a transitional-false term is constructed from a selected combination of the variables in the latter subset. During the given transition the transitional-true signals represented by the transitional-true term are combined with a transitional-false signal generated by the gate used to implement the transitional-false term. This combination results in the generation of a constant "1" during the transition which in turn maintains the stable $Y_j$ at a constant "1" value during the transition as required. Additionally, the transitional-true terms and transitional-false terms are such that if the $Y_j$ they are maintaining for the given transition is to go to "0" during a later state transition, either one or both of these terms will become false during the later transition resulting in $Y_j$ going to "0" and remaining "0" until a "change" term $T_{j,i}$ that generates $Y_j$ becomes true.

Applying the $L_{j,c} \cdot \overline{Z}_{j,c}$ expression of the general formula in the manner described above will insure that races on the second level gates of the circuits combination logic will be eliminated.

Although only the $Y_1$ map of FIG. 3 has been dealt with in detail, the procedure for ascertaining the logic equations from the $Y_2$ map (FIG. 3) for $Y_2$ is the same as that used for $Y_1$. It has already been shown that for $Y_1$; $L_{1,1}=Y_1$, $Z_{1,1}=\overline{X} \cdot \overline{Y}_2$ and $T_{1,1}=\overline{X} \cdot Y_2$. Similarly for $Y_2$; $L_{2,1}=Y_2$, $Z_{2,1}=X \cdot Y_1$ and $T_{2,1}=X \cdot \overline{Y}_1$. This information may be rewritten in the form of the general equation as follows:

$$Y_1=Y_1 \cdot (\overline{\overline{X} \cdot \overline{Y}_2})+\overline{X} \cdot Y_2 \quad (1)$$

$$Y_1=Y_1 \cdot (X+Y_2)+(\overline{X+\overline{Y}_2}) \quad (2)$$

$$Y_2=Y_2 \cdot (\overline{X \cdot Y_1})+X \cdot \overline{Y}_1 \quad (3)$$

It is clear from FIG. 2 that the preceding equations represent a modulo 4 counter. While it is this counter that will be discussed in detail, it is to be understood that it is only illustrative. Any normal mode sequential function can be realized in the general form shown in FIG. 1 if the circuit used satisfies the above-stated requirements.

Detailed description of the circuit

FIG. 5 shows a circuit which realizes the sequential function in FIG. 2. The circuit is a direct implementation of the logic Equations 2 and 3 above for $Y_1$ and $Y_2$.

Referring to FIG. 2, assume that the initial state of the circuit is the stable state $1_s$ and the input X equals "0." For this condition, $Y_1=0$, $Y_2=0$ and $X=0$. Referring to Equations 2 and 3 above, it is clear that no combination of these signals will enable any of the gates in the circuit. The circuit will remain in the $1_s$ state until X changes from "0" to "1" and this change results in a selected one of the circuit's gates being enabled.

When the "0" to "1" change in X arrives at gate 7 (FIG. 5) that gate will be enabled since $\overline{Y}_1=1$ and $X=1$ at that time. Referring to FIG. 2, $Y_1$ remains a stable "0" during the $1_s$ to $2_s$ transition. Consequently, gate 7 (FIG. 5) being enabled is dependent only upon the arrival of the "1" representing the change in X and there can be no $X-Y_1$ race involved in the transition. The "1" output of gate 7 results in OR gate 11 being enabled which generates $Y_2$.

The $Y_2=1$ signal is applied to gate 9 (FIG. 5) where it is combined with the output of NAND gate 6. Since $Y_1=0$; $X=1$, the output of NAND gate 6 is a "1" and this along with the $Y_2=1$ condition enables gate 9 which also drives OR gate 11. At this point the circuit is in the $2_s$ state (FIG. 2) with $Y_1=0$, $Y_2=1$ and $X=1$. It will be noted that the $Y_2$ input to gate 9 represents the $L_c$ term $Y_2$ in Equation 3 and the output of gate 6 represents the $\overline{Z}_c$ term $(\overline{X \cdot Y_2})$ of the same equation. These are the terms covering the $2_s$ to $3_s$ transition subcube enclosed in the dotted line in $Y_2$ map shown in FIG. 3.

The circuit will remain in the $2_s$ state until X changes from "1" to "0." When this occurs, there will be a transition from the $2_s$ state (FIG. 2) to the $3_s$ state. The transition will be from $2_s$ to unstable 2 to $3_s$ since the "1" to "0" change in X will be seen by the circuit before $Y_1$ changes. During the unstable state 3 (FIG. 3), $Y_1$ is unstable and will ultimately change from "0" to "1" making circuit's internal state the stable state $3_s$.

Referring to FIG. 5, when the above "1" to "0" change in X reaches gate 7, this gate will be disabled. The disabling of gate 7, however, does not result in $Y_2$ going to "0." As was mentioned above, gate 6, which also results in the generation of $Y_2$, is enabled and the $X=0$ condition does not effect its "1" output. Since gate 6 is an implementation of the logic term covering the $2_s$ to $3_s$ transition subcube of $Y_2$ shown enclosed in the dotted lines in FIG. 3, it will continuously generate a "1" during the $2_s$ to $3_s$ transition. The gates "1" output will not be interrupted by $Y_1$ changing to "1" since $X=0$ at this time. The continuous "1" output of gate 6 and the $Y_2=1$ condition keep gate 9 continuously enabled. The steady "1" output of gate 9 keeps gate 11 enabled resulting in the continuous generation of $Y_2=1$. Consequently, $Y_2$ will remain a constant "1" during the $2_s$ to $3_s$ transition as is required by the flow table of the sequential function shown in FIG. 2.

Referring to Equation 2 above, it is clear that the existence of $Y_2=1$ and $X=0$ results in $Y_1$ becoming a "1" during the unstable 3 state (FIG. 2). This is an example of a case where, due to the use of single rail values of X, complement logic has to be used to realize the desired logic term. Referring to Equation 1, the term which changes $Y_1$ from "0" to "1" during the unstable state 3 is the term $\overline{X} \cdot Y_2$. However, as will be recalled, in order to eliminate $X-\overline{X}$ races on first level gates, no $\overline{X}$ is supplied. Therefore, De Morgan's theorem is applied to this term yielding the $(\overline{X+\overline{Y}_2})$ term of Equation 2 which contains no $\overline{X}$. Obviously, this term can be implemented using a NOR gate and the output of the NOR gate will represent the same function as an AND gate responsive to $\overline{X} \cdot Y_2$. The NOR gate used to implement the term $(X+\overline{Y}_2)$ is gate 5 in FIG. 5.

It has been noted that during the $2_s$ to $3_s$ transition, $Y_2$ remains a constant "1." Therefore, when the $X=0$ signal arrives at NOR gate 5, both of that gate's inputs will be "0" and its output will become a "1." The "1" output of gate 5 enables gate 10, making $Y_1=1$. When this occurs, the circuit's internal state becomes stable state $3_s$ (FIG. 2) where $X=0$, $Y_1=1$ and $Y_2=1$.

Moreover, due to the stable $Y_2=1$ condition, the output of gate 4 (FIG. 5) is a continuous "1" during the $2_s$ to $3_s$ transition. When $Y_1$ changes to "1" during the transition, this "1" along with the "1" output of gate 4 enables gate 8 which also drives gate 10. Consequently, during the $3_s$ state, both inputs to gate 10 are "1."

Gates 4 and 8 implement the logic term $Y_1 \cdot (X+Y_2)$ in Equation 2. This term covers the $3_s$ to $4_s$ transition subcube of $Y_1$ which is enclosed by the dotted line on the $Y_1$ map in FIG. 3. The gate will remain continuously enabled during a $3_s$ to $4_s$ (FIG. 2) state transition.

The circuit will remain in the stable state $3_s$ (FIG. 2) until X changes from a "0" to "1." When this change in X occurs and is seen by the gates in the circuit, the $3_s$ to $4_s$ state transition will occur. During this transition, $Y_1$ remains a stable "1" (FIG. 2) and $Y_2$ changes from "1" to "0."

When the "0" to "1" change in X is felt by gate 6, both of that gate's inputs will be a "1" and its output will become a "0" resulting in gate 9 being disabled. Since the output of gate 7 is already a "0," the output of gate 9 going to "0" results in gate 11 being disabled and $Y_2$ goes to "0." This change in $Y_2$ represents the transition from unstable state 4 (FIG. 2) to stable state $4_s$ where $X=1$, $Y_1=1$ and $Y_2=0$.

As was mentioned above, $Y_1$ remains a constant "1" during this transition. This is accomplished by the gate 4 (FIG. 5), whose input terms cover the $3_s$ to $4_s$ transition subcube of $Y_1$ (FIG. 3), being continuously enabled during the transition. Prior to a "0" to "1" change in X, gate 4 is enabled by the $Y_2=1$ condition which exists during the state $3_s$ (FIG. 2). When X does change from "0" to "1" the $X=1$ condition if felt at gate 4 before $Y_2$ can be changed and continues to keep the gate enabled after $Y_2$ goes to zero during the unstable state 4. Consequently, the output of gate 4 is a continuous "1" during the $3_s$ to $4_s$ state transition. The constant "1" output of gate 4 and the initial $Y_1=1$ condition result in gate 8 being enabled which in turn, keeps gate 10 enabled. As a result $Y_1$ remains a constant "1" during the $3_s$ to $4_s$ transition as is required by the sequential function in FIG. 2.

As this point, the circuit is in the $4_s$ state (FIG. 2) where $X=1$, $Y_1=1$ and $Y_2=0$. It will remain in this state until X changes from "1" to "0." When this change in X occurs there will be a state transition from $4_s$ to $1_s$, putting the circuit back in the state it was assumed to be in at the outset of this discussion.

During the $4_s$ state (FIG. 2), neither gate 6 nor gate 7 (FIG. 5) is enabed and $Y_2=0$. Additionally the condition $Y_1=1$ is maintained only by the presence of the $X=1$ signal at gate 4 since $\overline{Y}_2=1$ results in a "0" output from gate 5. Therefore, when X changes from "1" to "0" and this change reaches gate 4, the gate will no longer be enabled and $Y_1$ will become a "0." At this time all of the inputs to OR gates 10 and 11 will be "0." This is equivalent to the transition from the stable state $4_s$ (FIG. 2) to the unstable state 1, where $Y_1$ goes to "0," and finally to the stable state $1_s$ when $Y_1=0$. The circuit will remain in the $1_s$ state until X changes from "0" to "1," at which time the $1_s$ to $2_s$ transition will occur again as discussed above.

The detailed description of the illustrative embodiment of applicant's invention has shown that a normal mode sequential function can be realized with a circuit requiring no delay elements. Input signals may be introduced directly into the combination logic and the circuit's operation will be free of steady state hazards if (1) only one input changes at a time, and (2) due to the response time of the combination logic gates, changes in input signals are seen by the circuit before the feedback signals can be altered. Steady state hazards are eliminated from the circuit operation by using only single rail values of input signals and by using a special method to select the logic terms that generate the feedback signals required to remain a constant "1" during a state transition.

Although the preceding detailed discussion dealt with an illustrative embodiment of applicant's invention having only a single input, it is clear that the invention can be extended to accommodate $n$ inputs as shown in FIG. 1. The single input embodiment was discussed because it completely discloses applicant's invention and avoids the repetition that would be inherent in the discussion of a multiple input embodiment of the invention.

It is to be understood that the above-described arrangements are merely illustrative of the numerous and various other arrangements which may form applications of the principles of the invention. These other applications may be readily devised by those skilled in the art without departing from the spirit and scope of the invention.

What is claimed is:

1. An asynchronous sequential circuit (FIG. 1) comprised of input lines (1) connected to combination logic (3) for implementing a sequential function, combination logic output lines (4), and direct connection feedback paths (2) for transmitting selected feedback signals from the combination logic output to the inputs of selected combination logic gates, the asynchronous sequential circuit being characterized in that its combination logic comprises gating means responsive to selected combinations of circuit input signals and combination logic feedback signals whose values are unstable during a given state transition of the circuit for generating a transitional-false signal; gating means responsive to said transitional-false signal and a selected combination of transitional-true circuit feedback signals for generating an enable signal; and gating means responsive to said enable signal for generating circuit output signals.

2. An asynchronous sequential circuit with direct connection feedback paths connecting selected circuit output signals to inputs of selected circuit gates, where the circuit combination logic comprises;

gating means responsive to a selected combination of circuit input signals and circuit output feedback signals whose values are unstable during a given state transition of said circuit for generating a transitional-false signal;

gating means for combining said transitional-false signals with selected transitional-true output feedback signals of said circuit to generate an enable signal; and output gating means responsive to said enable signal for generating a circuit output signal wherein said circuit output signal is one of said transitional-true signals.

3. The circuit of claim 2 further comprising gating means resposive to selected combinations of said circuit input signals whose values are unstable during said state transition and circuit output signals whose values remain stable during said state transition for generating an enable signal which drives said output gating means to produce said output signal.

4. An asynchronous sequential circuit comprising:

gating means responsive to a selected combination of circuit input and output signals whose values are unstable during a given state transition of said circuit for generating a transitional-false signal;

gating means responsive to the combination of said transitional-false signal and selected circuit output signals whose values remain a constat logical "1" during said transition for generating an enable signal of constant value for the duration of said transition; and gating means responsive to said enable signal for generating a circuit output signal wherein said output signal is one of said signals whose values remain a logical "1" during said transition.

5. An asynchronous sequential circuit comprising;

gating means responsive to selected combinations of circuit input signals and circuit output signals that are unstable during a given state transition of said circuit for generating a transitional-false signal;

gating means responsive to said transitional-false signal and selected combinations of circuit output signals that are stable during said state transition for generating an enable signal; and gating means responsive to said enable signal for generating a circuit output signal wherein said circuit output signal is one of said stable circuit output signals used to generate said enable signal;

6. In combination;

input lines for introducing a change in circuit input signals directly into the circuit;

a plurality of first gating means each having all of its used inputs connected directly to a selected combination of said input lines and the circuit output lines for generating a first enable signal;

a plurality of second gating means each having all of its used inputs connected directly to selected combinations of said first enable signals and said circuit output lines for generating a second enable signal;

a plurality of third gating means each havig all of its used inputs connected directly to a selected combination of said input lines and circuit output lines for generating a third enable signal; and output means responsive to selected combinations of said second and third enable signals for altering the circuit output signals on said output lines to reflect said change in circuit input signals.

7. In combination;

input lines for introducing a change in signal input directly into the circuit;

a plurality of first gating means each having all of their used inputs connected directly to a selected combination of said input lines and the circuit output lines for maintaining a constant enable signal during a selected transition of the circuit's internal state;

a pluraliy of second gating means each responsive to selected combinations of said enable signals and circuit output signals connected directly to said second gating means as inputs for generating a second enable signal that also remains constant during said selected transition of the circuit's internal state;

output means selectively responsive to said second enable signal for altering said circuit output signals to reflect the change in circuit input signals.

8. The combination of claim 7 wherein the direct connections between each of said second gating means and said selected output signals connect the output signal of the output means driven by said second gating means as an input signal to said second gating means.

9. An asynchronous sequential circuit comprising;

input lines carrying single rail signal values of circuit input signals for introducing changes in said circuit input signals directly into the circuit;

a plurality of first gating means each having all of its used inputs connected directly to a selected combination of said input lines and the circuit output lines for generating a first enable signal;

a plurality of second gating means each having all of its used inputs connected directly to a selected combination of said first enable signals and said circuit output lines for generating a second enable signal;

a plurality of output means each responsive to selected ones of said second enable signals for altering the circuit output signals to reflect a change in said circuit input signals.

References Cited

UNITED STATES PATENTS

| | | | |
|---|---|---|---|
| 3,103,577 | 9/1963 | Willard | 328—96 |
| 3,178,590 | 4/1965 | Heilweil et al. | 307—207 |
| 3,299,285 | 1/1967 | Cannon | 307—208 |

DONALD D. FORRER, Primary Examiner

D. M. CARTER, Assistant Examiner

U.S. Cl. X.R.

307—207, 218